Patented Nov. 28, 1933

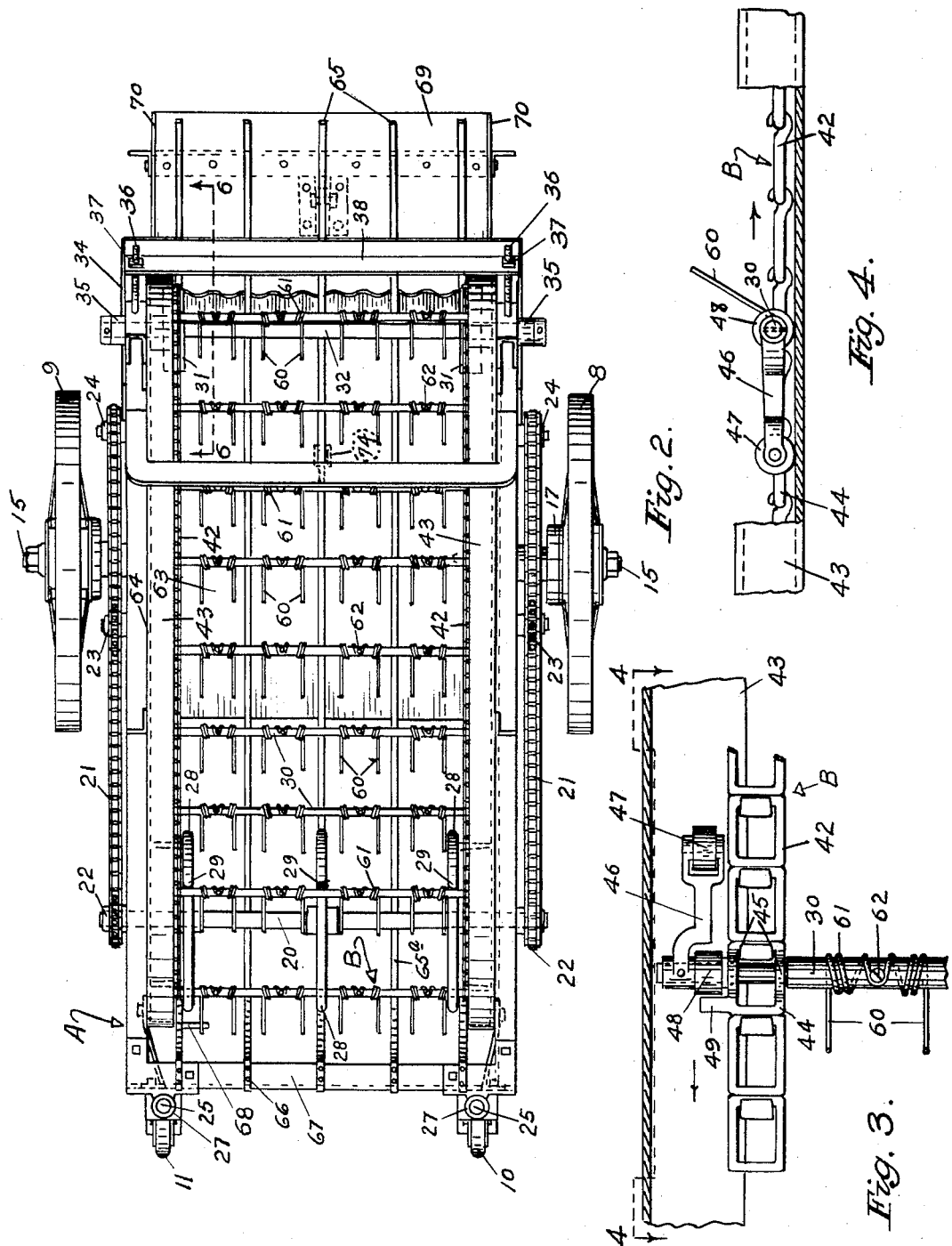
Nov. 28, 1933.  H. A. LARSON  1,936,603
HAY LOADER
Filed March 5, 1932  3 Sheets-Sheet 2

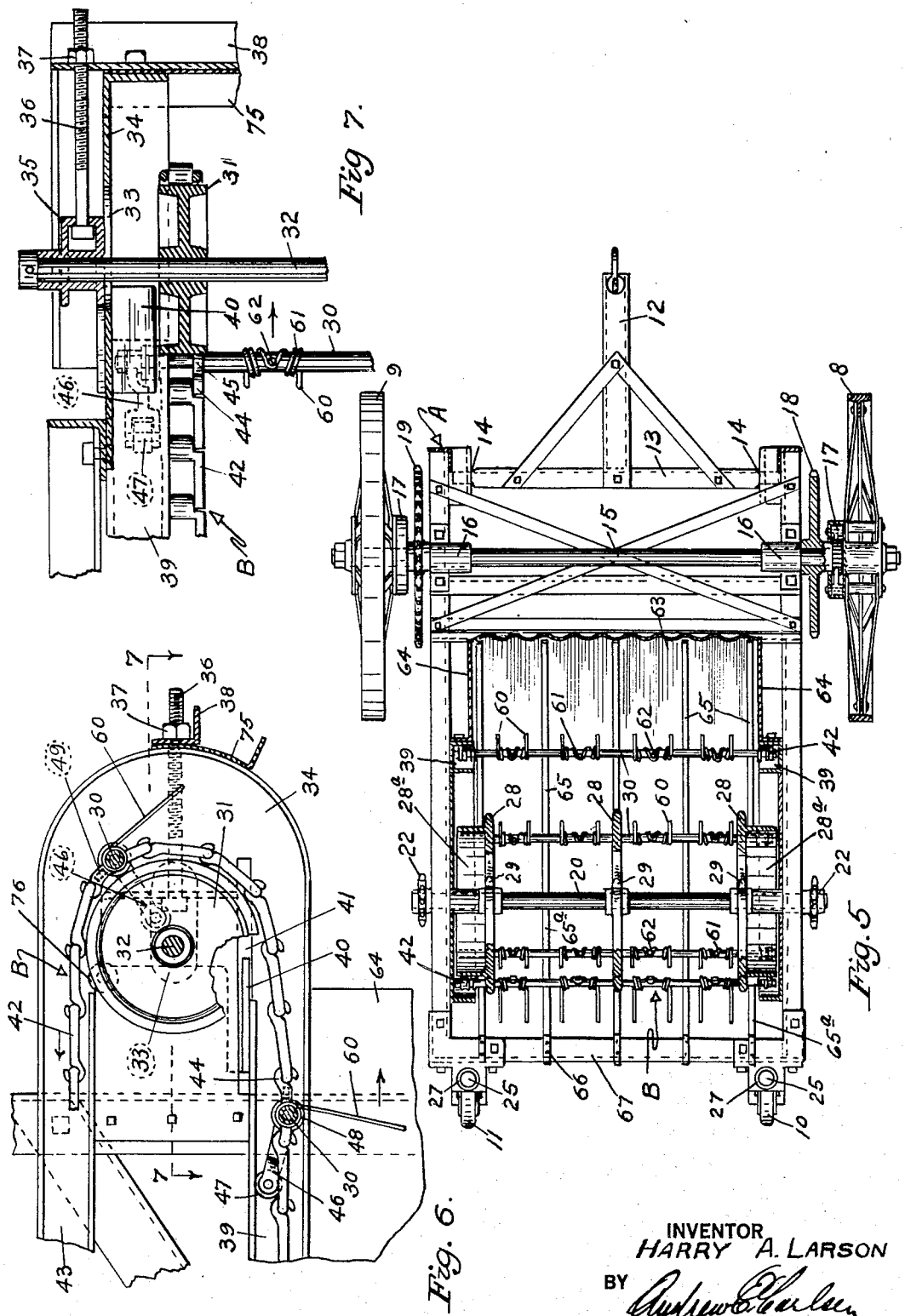

1,936,603

UNITED STATES PATENT OFFICE 1,936,603

HAY LOADER

Harry A. Larson, Cokato, Minn.

Application March 5, 1932. Serial No. 597,047

15 Claims. (Cl. 56—345)

This invention relates to crop handling machinery and the primary object is to provide a novel, efficient, and practical design of machine that is particularly adapted for loading crops such as hay into a vehicle, behind which the machine is drawn, and from the ground where such crop has preferably been raked into windrows. Further objects are to provide improved forms of drive and adjustment mechanisms, and particularly to provide novel means and devices for initially engaging the crop and conveying it into the receptacle of the vehicle to which the loader is attached. These and still other more detailed and specific objects will be disclosed in the course of the following specification, reference being had to the accompanying drawings, wherein:

Fig. 2 is a plan view of the machine.

Fig. 3 is an enlarged detail sectional view on the line 3—3 in Fig. 1.

Fig. 4 is a sectional detail view on the line 4—4 in Fig. 3.

Fig. 5 is a sectional plan view on the line 5—5 in Fig. 1.

Fig. 6 is an enlarged detail section on the line 6—6 in Fig. 2.

Fig. 7 is an enlarged detail view on the line 7—7 in Fig. 6.

Figure 1:
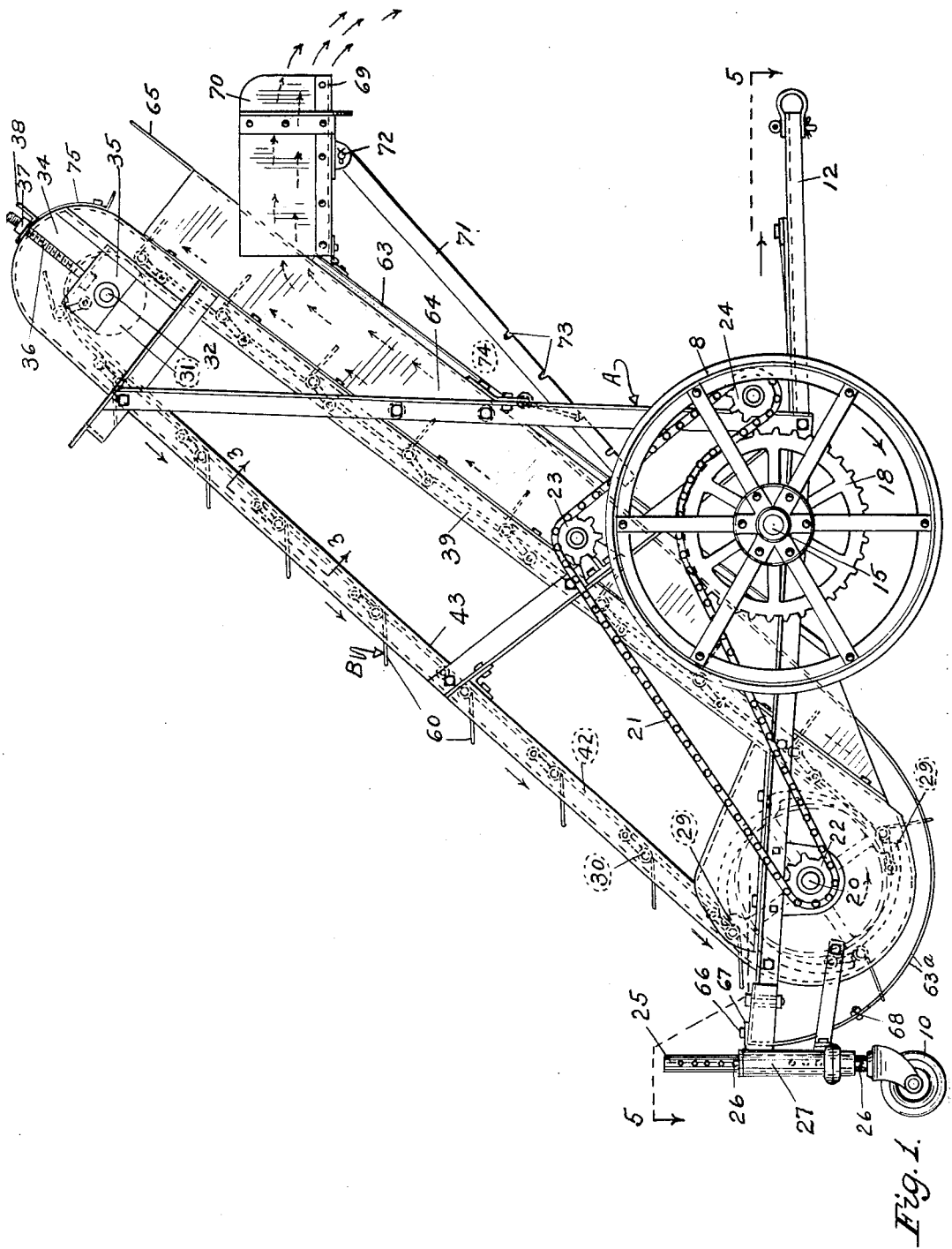
Fig. 1 is a side elevation of the machine.

Referring to the drawings more particularly and by reference characters, A designates generally the main frame of the machine, and as such is essentially made up of a plurality of rigidly connected angle iron bars.

The frame is carried upon relatively large ground wheels 8 and 9, and comparatively smaller casters 10 and 11, the latter being at the rear of the machine; and the machine is drawn by being connected to the wagon or truck to be loaded by a draft frame including a tongue 12 rigidly connected to a cross bar 13, the ends of which are rotatable in the frame A as at 14.

The wheels 8 and 9 are mounted upon the ends of a transversely disposed shaft 15 which is journaled in bearings 16 of the frame A, and each of these wheels is provided with a ratchet mechanism such as indicated at 17 in Fig. 5, whereby the wheels when moving forwardly over the ground will rotate the shaft 15, and when one wheel moves faster than the other, as when in turning, then such wheel will of course rotate the shaft 15 at the same speed at which it is travelled. This construction will also permit the machine to move rearwardly without rotating the shaft 15 in the reverse direction.

Intermediate the ground wheels 8—9 and the frame A, I provide the shaft 15 with a pair of large sprocket wheels 18 and 19, which drive the main drive shaft 20 of the elevating conveyor through the medium of sprocket chains 21 which operate over the sprocket wheels 18 and 19, and engage sprocket pinions 22 on the respective ends of the main drive shaft 20. In order to provide for the proper direction of movement to the chains 21 they are arranged as shown in Fig. 1, so that the lower run of the chain will engage over the top segment or section of the wheels 18 and 19, and to this end it is necessary to provide a pair of idler pinions 23 and 24 for each chain 21. The pinion 24 in each case is so arranged that it will cause a substantial part or length of the chain 21 to simultaneously engage the plurality of teeth on the sprocket wheel 18, and the primary purpose of the idler pinion 23 is to keep the upper run of the chain 21 out of contact with the lower run.

The entire machine is so balanced with respect to the supporting center 15, so that a part of the rear or heavier end is carried by the casters 10 and 11, with a result that the said casters have trailing contact with the ground surface and are not intended to form substantial supports for the machine, but are primarily intended to merely provide the necessary supporting contact to carry a small part of the load, and have their spindles 25 vertically adjustable in any suitable manner such as by removable pins 26 so that the operative height of the pick-up mechanism at the lower or rear end of the conveyor system may be adjusted at will to meet with various conditions of work. The spindles 25 are of course rotatable and vertically adjustable in sleeve members 27 which are in turn secured to the rear end of the frame A.

It may be mentioned that under certain circumstances, such for instance as when transporting the machine from one place to another in an idle condition, it may be found desirable to tilt the front end of the machine down and rest it upon the pulling vehicle, in which event the casters will be entirely raised from ground contact. Under normal operating conditions, however, the casters will remain as shown in Figs. 1, 2, and 5, and as such will properly trail behind the larger ground wheels 8 and 9, and while so doing will properly support the rear and slightly heavier end of the machine.

The drive shaft 20 is provided with a set of three similarly formed supporting and driving disks or wheels 28 for an endless conveyor designated generally by the character B. The peripheries of these wheels are divided into cam shaped sectors terminating in shoulders 29 for positively engaging the cross bars 30 of the conveyor B and are so designed, in preference to gear teeth or notches, as they are less apt to catch and retain the hay or other crop material coming in contact therewith. The two end wheels 28 are preferably provided with integral outer flanges 28a (Fig. 5) for supporting the side chains of the endless conveyor. The upper end of the conveyor travels over idler pulleys 31 on a cross shaft 32. This shaft extends through slots 33, in the side walls 34 of the upper conveyor frame, and into bearing blocks 35 which are in turn adjustably secured by tightener bolts 36 having adjuster nuts 37 engaging a cross bar 38 through which these bolts extend. Thus, by adjusting the nuts 37 the endless conveyor may be tightened or loosened as occasion may require.

It may here be noted that the under or lower run of the endless conveyor travels upwardly and forwardly in opposed channels 39, one at each side of the conveyor frame, and that at their upper ends the upper flanges of these channels (see Figs. 6 and 7) are supplemented by lugs or plate extensions 40 which are integral with the bearing blocks 35 and project in through slots 41 of the side walls 34 to form terminal ends for said upper flanges, thus leaving the effective ends of said flanges always in the same positions with respect to the shaft 32 and irrespective of any adjustments made to the bearing blocks 35 by the adjuster devices 36—37. The purpose of this arrangement will presently be set forth.

The endless conveyor B is made up of the cross rods 30, already noted, and a pair of side chains 42 which travel upwardly and forwardly in the previously noted channels 39, and return downwardly and rearwardly in upper, opposed channels 43, also forming rigid parts of the conveyor frame. The chains 42 are of conventional sprocket design except for having specially designed links 44 at predetermined spaced intervals, and these links are provided with lugs 45 forming bearings for reduced ends of the cross bars 30. The shafts or cross bars 30 are oscillated, at predetermined intervals, by arms 46 rigidly secured to the extreme ends of the bars, and these arms may be provided with rollers 47, for engagement with the channel flanges to reduce friction and noise. It may here be also noted that rollers 48 may be provided on the cross bars 30, intermediate the chains 42 and arms 46 (Fig. 3) and their purpose, also, is to reduce chain drag and to eliminate friction and noise as far as possible. The links 44, in addition to the lugs 45, are provided with projecting fingers 49 to serve as stops for the arms 46 during a certain period of travel as will later be described.

Each of the conveyor bars 30 is provided with a series of parallel tines or prongs 60, arranged in pairs and each pair being formed by the terminal ends of wire coils 61 which are in turn twisted about the bar and secured thereto by intermediately arranged screws 62. Thus while the coils and prongs are non-rotatable with respect to the bars, they provide sufficient flexibility so that the prongs may slip over any unyielding obstruction with which they may come in contact.

As the lower run of the endless conveyor moves upwardly, with the chains 42 travelling in the side channels 39, the arms 46 (or the rollers 47 thereof) guide against the upper channel flange so as to retain the prongs 60 in substantially right angular positions with respect to the plane of travel, with a result that they are practically perpendicular with respect to a bottom wall or floor 63 of a trough or chute having side walls 64, between which and adjacent to which floor the said conveyor prongs 60 travel. The floor 63 is longitudinally corrugated as shown for reinforcement purposes so as to better sustain and also to partially guide the crop load being impelled upwardly over it by the conveyor tines 60.

A series of spaced parallel stripper bars 65 are disposed loosely upon the floor 63, with their upper ends extending therebeyond, as shown in Figs. 1 and 2, and, at their lower ends, these stripper bars are provided with arcuately curved portions 65a which are anchored as at 66 to a rear cross bar 67 of the frame A. One of the stripper bars is preferably provided near its lower end, with a trip finger 68 for momentarily and successively engaging certain of the end prongs 60 to insure that each series of prongs will be set in proper operating position before initially engaging the field crop to be loaded.

The chute floor 63 at its upper end terminates short of the upper ends of the side walls 64, and the main chute formed by these elements is provided at the upper terminus of the floor with a supplemental adjustable chute formed by a plate member 69 having side flanges 70 and supporting framework including a brace bar 71 that is pivotally connected as at 72 to the supplemental chute and has a series of edge notches 73, in a lower portion, for selective engagement with a link 74 carried by the main frame A. Thus the delivery angle or elevation of the supplemental chute may be varied or adjusted as occasion may require.

The operation of the machine may be described as follows:

When in active use the loader is drawn behind the truck or wagon to be loaded by having the draft tongue 12 hitched thereto, and with the supplemental chute 69—70 adjusted to a proper loading position with respect to the receptacle of the pulling vehicle. As the machine now moves forwardly over the windrow of hay or other crop the ground wheels 8 and 9 operate through the clutch mechanisms 17 and the large sprocket gears 18 and 19 to rotate the shaft 20 through the medium of the sprocket chain 21. As the shaft 20 rotates in the direction indicated by the arrows, the endless conveyor B is propelled so that its lower run operates in a forward and upward direction in the trough 63—64. The control arms 46 at the extreme ends of the cross bars 30 move upwardly in the channels 39 and are maintained between the flanges of these channels so that the rake acting tines 60 will be held in a substantially perpendicular position with respect to the trough floor 63, and prior to entering these channels 39 the arms 46 similarly engage the integral flanges 28a of the outer wheels 28 so that the tines 60 will assume a substantially radial position with respect to the shaft center 20; and consequently the tines, as they pass under this shaft, will engage the crop lying upon the ground and move it forwardly, and as the crop accumulates between the vertical plane of the shaft 20 and the ground wheels 8 and 9, the tines 60 as they continue to move upwardly in the trough 63—64 will engage this accumulated crop and carry it upwardly to the end of the trough where it will be discharged upon the chute 69—70, and from there will gradually find its way to the vehicle receptacle under its discharge end.

The stripper bars 65 merely rest upon the crop load as it is moved upwardly in the trough and hold it down sufficiently so that it will travel in a somewhat compact mass and will not be in any way disturbed when for instance blown by the wind. These stripper bars 65 will also have a tendency to strip the crop from the tines 60 as they reach a position adjacent the supplemental trough 69—70. It may be found, however, that under certain circumstances and with certain types of crop material, that a portion of the crop will have a tendency to cling to the tines 60, and to eliminate any carry over of crop material by the tines I eliminate any element corresponding to the flanges 28a about the upper shaft 32, but merely provide the extensions 40 of the channel flanges 39, and as the control arms 46 or their rollers 47, if they are so provided, disengage the members 40, the said arms will immediately swing inwardly toward the shaft 32, thus permitting the tine groups 60 of each bar 30 to drop into the rear or trailing position indicated at the right in Fig. 6, and as they do so they will immediately pull out of any crop material that may still be clinging to them. And this cleaning action is further supplemented by a cross plate 75 at the upper end of the conveyor frame.

In some circumstances it may be found that as the arms 46 are freed from the members 40, they will have a tendency to swing too far in the opposite direction, and to eliminate any difficulty in this connection I have provided the previously described stops 49. As the conveyor passes over the pulleys 31, the arms 46 will be restored to their trailing positions by engaging a roller 76 (see Fig. 6) at the upper end of the upper channels 43, and thereafter the tines 60 will assume the positions as shown substantially in Fig. 1. As the tines now reach the lower end of the conveyor there may in some instances be a tendency for them to assume a too forward position, and to eliminate this possibility I have provided the trip finger 68 over which one end tine of each group may engage so as to swing the tine slightly rearwardly, as indicated in Fig. 1.

It will be understood that the supplemental chute 69—70 can be raised or lowered by merely releasing and resecuring the link 74 in the proper notch 73, and it will further be understood that to adjust the position of the pick up end of the conveyor with respect to the ground surface it is only necessary to remove the pins 26 and reinsert them in the spindle 25 so that the rear end of the machine can be carried by the casters 10 and 11 at any desired height.

It is further understood that suitable modifications may be made in the structure as disclosed, provided such modifications come within the spirit and scope of the appended claims. Having now therefore fully illustrated and described my invention, what I claim to be new and desire to protect by Letters Patent is:

1. In a crop loading machine of the character described, a wheel supported frame, an inclined trough carried by the frame for supporting the crop to be elevated, an endless conveyor having its lower run operative in said trough to move the crop upwardly therein, laterally disposed channel flanges adjacent said conveyor, rake acting devices carried by and forming part of the conveyor, said devices having means for engagement with the said channel flanges to maintain themselves in predetermined operative positions, during certain periods of travel, and adjustable extensions at the upper ends of said channel flanges for regulating the effective lengths thereof.

2. In a crop loading machine of the character described, a wheel supported frame, an inclined trough carried by the frame for supporting the crop to be elevated, an endless conveyor having its lower run operative in said trough, rake acting members carried by the conveyor, means for maintaining said members in substantially perpendicular positions with respect to the bottom of the trough as they move upwardly therein, and adjustable means adjacent the upper end of the trough to effectively disengage the said maintaining means to permit the withdrawal of the rake acting members from the crop at a predetermined point during the course of conveyor travel.

3. In a crop loading machine, a wheel supported frame, an inclined trough supported by the frame, an endless conveyor disposed with its lower run immediately over the trough and comprising side chains, spaced cross bars journaled in and connecting the chains, tines extending from the cross bars, and control arms at the ends of the cross bars for controlling oscillating movements thereof; a pair of opposed channels for guiding the lower runs of the conveyor chains and for engagement by said control arms, means for adjusting the operative length of the conveyor, and means movable in conjunction with said adjusting means for effectively releasing the control arms from engagement with said channels at predetermined points in the course of travel.

4. In a crop loading machine the combination comprising a wheel supported trough and conveyor frame, an endless conveyor operative over upper and lower shafts in the frame, adjustable bearing members for the upper shaft, tine bearing cross bars forming part of the conveyor and having position controlling arms at the ends thereof, flange members carried by the frame for engaging said arms, and flange extension members, at the upper ends of said flange members, carried by and adjustable with said bearing members.

5. In a crop loading machine the combination comprising a wheel supported trough and conveyor frame, an endless conveyor operative over upper and lower shafts in the frame, adjustable bearing members for the upper shaft, tine bearing cross bars forming part of the conveyor and having position controlling arms at the ends thereof, flange members carried by the frame for engaging said arms, and flange extension members, at the upper ends of said flange members, said flange extension members being mounted for adjustment by and in conjunction with the bearing members.

6. A crop loading machine comprising a wheel supported inclined trough and conveyor frame, an endless conveyor mounted on upper and lower shafts in the frame and with its lower run operative in the trough, opposed channels carried by the frame for guiding the upper and lower conveyor runs, said conveyor having oscillatable tine bearing cross bars provided at their ends with rollers for engaging in said opposed channels, and having control arms adjacent said rollers for guiding engagement in the channels.

7. A crop loading machine comprising a wheel supported inclined trough and conveyor frame, an endless conveyor mounted on upper and lower shafts in the frame and with its lower run operative in the trough, opposed channels carried by the frame for guiding the upper and lower conveyor runs, said conveyor having oscillatable tine bearing cross bars provided at their ends with rollers for engaging in said opposed channels, and having control arms adjacent said rollers for guiding engagement in the channels, said control arms being provided with rollers for contacting engagement with the channel flanges.

8. A crop loading machine comprising a wheel supported inclined trough and conveyor frame, an endless conveyor mounted on upper and lower shafts in the frame and with its lower run operative in the trough, opposed channels carried by the frame for guiding the upper and lower conveyor runs, said conveyor comprising side chains having links at spaced intervals provided with bearing lugs, cross bars connecting the chains and journaled in said bearing lugs, tines carried by the bars and guide arms secured to the ends of the bars for guiding engagement in said channels.

9. A crop loading machine comprising a wheel supported inclined trough and conveyor frame, an endless conveyor mounted on upper and lower shafts in the frame and with its lower run operative in the trough, opposed channels carried by the frame for guiding the upper and lower conveyor runs, said conveyor comprising side chains having links at spaced intervals provided with bearing lugs, cross bars connecting the chains and journaled in said bearing lugs, tines carried by the bars and guide arms secured to the ends of the bars for guiding engagement in said channels, said spaced links having stop fingers for engagement by said guide arms.

10. A crop loading machine comprising a wheel supported inclined trough and conveyor frame, an endless conveyor mounted on upper and lower shafts in the frame and with its lower run operative in the trough, opposed channels carried by the frame for guiding the upper and lower conveyor runs, said conveyor comprising side chains having links at spaced intervals provided with bearing lugs, cross bars connecting the chains and journaled in said bearing lugs, tines carried by the bars and guide arms secured to the ends of the bars for guiding engagement in said channels, said tines being formed of the terminal ends of wire coils wound about and secured to the cross bars.

11. A crop loading machine comprising a wheel supported frame, an inclined trough carried by the frame, shafts adjacent upper and lower ends of the trough, means for driving one of said shafts, an endless conveyor extending about the shafts and comprising side chains and cross bars, spaced wheels on said driven shaft for supporting the endless conveyor, said wheels having cam shaped peripheral surfaces terminating in shoulders for driving contact with the cross bars of the endless conveyor.

12. A crop loading machine comprising a wheel supported frame, an inclined trough carried by the frame, shafts adjacent upper and lower ends of the trough, means for driving one of said shafts, an endless conveyor extending about the shafts and comprising side chains and cross bars, spaced wheels on said driven shaft for supporting the endless conveyor, said wheels having cam shaped peripheral surfaces terminating in shoulders for driving contact with the cross bars of the endless conveyor, and certain of said wheels having annular flange portions for supportably engaging the side chains of the conveyor.

13. In a crop loading machine the combination comprising a wheel supported trough and conveyor frame, an endless conveyor operative over upper and lower shafts in the frame, adjustable bearing members for the upper shaft, tine bearing cross bars forming part of the conveyor and having position controlling arms at the ends thereof, flange members carried by the frame for engaging said arms, and flange extension members, at the upper ends of said flange members, carried by and adjustable with said bearing members; the wheel supports for said conveyor frame comprising relatively large ground wheels at the sides, and vertically adjustable caster wheels at the rear of the machine.

14. A crop loading machine comprising an inclined trough and conveyor frame, main ground wheels and auxiliary caster wheels supporting the frame, an endless conveyor mounted on upper and lower shafts in the frame and with its lower run operative in the trough, tines carried by the conveyor for gathering the crop as the machine moves forwardly and conveying it up through said trough, and a series of transversely spaced stripper bars disposed in said trough and under said conveyor.

15. A crop loading machine comprising an inclined trough and conveyor frame, wheels, including casters supporting the frame, means for vertically adjusting the casters, an endless conveyor mounted on upper and lower shafts in the frame and with its lower run operative in the trough, tines carried by the conveyor for gathering the crop as the machine moves forwardly and conveying it up through said trough, and a series of transversely spaced stripper bars disposed in said trough and under said conveyor, said stripper bars being anchored at their lower ends to the frame and with their upper portions free for resting on the upwardly moving crop in the trough.

HARRY A. LARSON.